(12) United States Patent
Kaneda et al.

(10) Patent No.: US 9,034,214 B2
(45) Date of Patent: May 19, 2015

(54) FINE SILVER PARTICLE POWDER, METHOD FOR MANUFACTURING THE SAME, SILVER PASTE USING THE POWDER, AND METHOD OF USE OF THE PASTE

(75) Inventors: Shuji Kaneda, Okayama (JP);
Kimikazu Motomura, Okayama (JP);
Tatsuya Kariyasu, Okayama (JP);
Yutaka Hisaeda, Okayama (JP);
Kosuke Iha, Okayama (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 924 days.

(21) Appl. No.: 13/142,181

(22) PCT Filed: Dec. 25, 2009

(86) PCT No.: PCT/JP2009/007258
§ 371 (c)(1),
(2), (4) Date: Jun. 24, 2011

(87) PCT Pub. No.: WO2010/073705
PCT Pub. Date: Jul. 1, 2010

(65) Prior Publication Data
US 2011/0253949 A1    Oct. 20, 2011

(30) Foreign Application Priority Data

Dec. 26, 2008  (JP) ................... 2008-335188
Jun. 19, 2009  (JP) ................... 2009-146921
Dec. 16, 2009  (JP) ................... 2009-285691

(51) Int. Cl.
*H01B 1/22* (2006.01)
*B22F 1/00* (2006.01)
(Continued)

(52) U.S. Cl.
CPC ................ *H01B 1/22* (2013.01); *B22F 1/0014* (2013.01); *B22F 1/0018* (2013.01);
(Continued)

(58) Field of Classification Search
CPC .......................................................... H01B 1/22
USPC .......................... 252/514; 75/371; 423/23, 42
See application file for complete search history.

(56) References Cited

U.S. PATENT DOCUMENTS 5,250,101 A    10/1993   Hidaka et al.
5,964,918 A    10/1999   Asada et al.
(Continued)

FOREIGN PATENT DOCUMENTS

EP    0 508 757 A1    10/1992
JP    5-156326 A      6/1993
(Continued)

OTHER PUBLICATIONS

English language machine translation of JP-2006-111903 (pub Apr. 2006).*
(Continued)

*Primary Examiner* — Mark Kopec
(74) *Attorney, Agent, or Firm* — Greenblum & Bernstein, P.L.C.

(57) ABSTRACT

A method suitable for mass production of nanoparticles with a uniform particle diameter is provided. It is an object to provide a powder of the nanoparticle obtained by this method, a dispersion containing the nanoparticles, and a paste containing the nanoparticles. There is provided a method for manufacturing silver particles including the step of reducing silver in a silver solution containing a protective agent composed of an organic material and a copper component in an amount of 1 to 1,000 ppm relative to the amount of silver to obtain particles having an average particle diameter ($D_{TEM}$) of 5 to 100 nm as measured using a transmission electron microscope.

10 Claims, 10 Drawing Sheets

(51) Int. Cl.
  *B22F 9/24* (2006.01)
  *B82Y 30/00* (2011.01)
  *C09C 1/62* (2006.01)
  *C09D 5/24* (2006.01)
  *C09D 17/00* (2006.01)
  *C22C 5/06* (2006.01)
  *H01M 4/38* (2006.01)

(52) U.S. Cl.
  CPC ............ *B22F 1/0062* (2013.01); *B22F 1/0074* (2013.01); *B22F 9/24* (2013.01); *B82Y 30/00* (2013.01); *C01P 2004/04* (2013.01); *C01P 2004/64* (2013.01); *C01P 2006/11* (2013.01); *C01P 2006/12* (2013.01); *C09C 1/62* (2013.01); *C09D 5/24* (2013.01); *C09D 17/006* (2013.01); *C22C 5/06* (2013.01); *H01M 4/38* (2013.01)

(56) References Cited

U.S. PATENT DOCUMENTS

| | | | |
|---|---|---|---|
| 8,287,771 B2 * | 10/2012 | Sato et al. | 252/514 |
| 8,420,165 B2 * | 4/2013 | Sato et al. | 427/216 |
| 2007/0039417 A1 * | 2/2007 | Huang et al. | 75/371 |
| 2010/0101637 A1 * | 4/2010 | Yamasaki et al. | 136/252 |

FOREIGN PATENT DOCUMENTS

| | | |
|---|---|---|
| JP | 2004-68072 A | 3/2004 |
| JP | 2006-111903 A | 4/2006 |
| JP | 2006-124787 A | 5/2006 |
| JP | 2006-216389 A | 8/2006 |
| JP | 2007-146279 A | 6/2007 |
| JP | 2007-263860 A | 10/2007 |
| JP | 2007-291513 A | 11/2007 |
| JP | 2008-156720 | 7/2008 |
| JP | 2008-297580 A | 12/2008 |
| TW | 458829 | 10/2011 |
| WO | WO2008/099510 | 8/2008 |
| WO | WO2008/105456 | 9/2008 |

OTHER PUBLICATIONS

Wanf et al "Mechanism of PVP in the Preparation of silver nanoparticles", Materials Chem and Physics 94 (2005) 449-453.*
Office Action from Taiwanese Patent Office in counterpart Application No. 098144949, mail date is Jul. 30, 2014.
Search report from European Patent Office (EPO) in counterpart Application No. 09834511.9, mail date is Feb. 20, 2014.
Japanese OA in counterpart application No. 2009-285691, dated Dec. 24, 2013.

* cited by examiner

FINE SILVER PARTICLE POWDER, METHOD FOR MANUFACTURING THE SAME, SILVER PASTE USING THE POWDER, AND METHOD OF USE OF THE PASTE

TECHNICAL FIELD

The present invention relates to silver particles that can be suitably used for traces, electrodes, and the like of electronic devices, to a dispersion containing the silver particles, to a paste containing the silver particles, and to a method for manufacturing the silver particles.

BACKGROUND ART

Particles with diameters of less than 100 nm (hereinafter referred to as nanoparticles) are known to exhibit properties different from those of particles with diameters of 1 μm or more. In recent years, such properties (for example, low-temperature sinterability of particles) are being utilized in the field of electric and electronic devices to reduce their size.

The methods for manufacturing nanoparticles are broadly classified into two types, i.e., the liquid phase method in which nanoparticles are produced in a liquid and the gas phase method in which nanoparticles are formed in a gas phase. The production in a gas phase is generally performed in a high-vacuum state, and therefore a large-scale apparatus must be used. Accordingly, the gas phase method has problems in that the initial investment is high and that the method is not suitable for mass production. The problems in the gas phase method are less likely to occur in the liquid phase method, but the particles produced by the liquid phase method may have large variation and are not preferably used in some applications.

Particularly, when nanoparticles are produced by a conventional method in which a reducing agent is added at once to a solution of a metal salt, the nucleation and growth of the metal particles cannot be easily controlled, and therefore it is difficult to obtain particles with a uniform diameter.

In addition, to avoid spontaneous sintering of nanoparticles, the particles must be subjected to anti-sintering treatment by forming a coating component on their surfaces. The anti-sintering treatment must be performed at the initial stage of the reaction to maintain the independence of the particles. However, the use of the surface coating component without any treatment in the environment in which the production reaction proceeds at once as described above causes greater difficulty in obtaining uniformity of the particles.

Various methods have been used to solve the above problems. More specifically, one exemplary method (see, for example, Patent Document 1) uses slow reduction, and another exemplary production method (see, for example, Patent Document 2) uses a continuous flow scheme. Moreover, in the technology (see Patent Document 3), to obtain silver flakes with a uniform particle diameter, although the diameter does not fall within the particle diameter range, a foreign component (copper) is used to increase the particle size and the crystallinity.

CITATION LIST

Patent Literature

Patent Document 1: Japanese Patent Application Laid-Open No. 2007-146279
Patent Document 2: Japanese Patent Application Laid-Open No. 2004-068072
Patent Document 3: Japanese Patent Application Laid-Open No. 2006-111903

SUMMARY OF INVENTION

Problems to be Solved by the Invention

In Patent Documents 1 and 2, some success in improving the uniformity of the particle diameter is achieved. However, in the reaction scheme in Patent Document 1 in which reduction proceeds slowly, the reaction can take a considerable time, and this scheme is not always preferred in applications in which mass production is desired. In the continuous production method in Patent Document 2, a large amount of defective products can be produced because only a few methods are available, particularly for nanoparticles, to check for problems that may occur unexpectedly. Therefore, highly uniform particles are difficult to obtain using the conventionally known methods.

Next, attention is given to a dispersion. As described in, for example, Patent Document 1, solvent replacement must be preformed. Since the concentration of silver in a solvent obtained is relatively low (1.5 to 9.5%), concentration must be performed to obtain a concentration suitable for use. This causes a problem in that the concentrating step using ultrafiltration takes a long time. Therefore, further improvement is required from the viewpoint of mass productivity.

The technology in Patent Document 3 is a batch reaction, and Patent Document 3 shows that particles with a uniform diameter can be obtained. However, only particles with a diameter of about 300 nm can be formed, and these particles are slightly too large to draw fine-pitch traces. To reduce the particle diameter, it is necessary to add a large amount of copper. There is also a description that small diameter particles cannot be obtained if the amount of copper added to the reaction mixture is less than 0.1 percent by weight. Therefore, it is difficult to obtain a large amount of nanoparticles by simply applying this method.

Accordingly, it is an object of the present invention to provide a method suitable for mass production of nanoparticles with a uniform diameter. It is another object of the present invention to provide a nanoparticle powder obtained by the above method, a dispersion containing the nanoparticles, and a paste containing the nanoparticles.

Means for Solving the Problems

The present inventors have found through their studies that the above objects can be achieved by reducing silver ion in a solution that contains copper in an amount of 1 to 1,000 ppm relative to the amount of silver and a protective agent composed of an organic material. This procedure allows silver nanoparticles with an average particle diameter of 5 to 100 nm as measured using a transmission electron microscope to be obtained.

To ensure low-temperature sinterability, an organic acid having 5 to 8 carbon atoms is used as the protective agent with which the surfaces of the metal nanoparticles are coated. The used protective agent may be a saturated organic acid or an unsaturated organic salt.

The present invention can be described as follows. The present invention is a method for manufacturing silver nanoparticles by a reaction initiated by mixing a silver solution, a protective agent, and a reducing agent. The method includes the steps of: mixing the protective agent, the reducing agent, and a copper component in an amount of 1 to 1,000 ppm relative to the amount of silver into a reaction solution; and adding the silver solution to the resultant reaction solution to precipitate silver nanoparticles of which surfaces are coated with an organic material.

In a more specific aspect, the present invention is a method for manufacturing silver nanoparticles by a reaction initiated by mixing a silver solution, a protective agent, and a reducing agent. The method includes the steps of: mixing the protective agent and the reducing agent; mixing the silver solution and a copper component in an amount of 1 to 1,000 ppm with respect to the amount of silver in the silver solution; and mixing these mixed solutions to precipitate silver nanoparticles of which surfaces are coated with an organic material.

The present invention is also a method for manufacturing a silver particle dispersion. The method includes the step of obtaining a powder of metal nanoparticle aggregates by subjecting any of the above-obtained silver nanoparticles to filtration, washing with water, and drying and then dispersing the obtained powder of the aggregates in a dispersion medium.

The present invention is also a method for manufacturing a silver nanoparticle paste. The method includes the step of adding a resin to the dispersion.

The material obtained through any of the above reactions is a powder of particles of which surfaces are coated with a protective to agent composed of an organic material having 5 to 8 carbon atoms, which have an average particle diameter of 5 to 100 nm computed from a transmission electron microscope photograph (hereinafter referred to as a "TEM photograph" or "TEM" image), and which contain copper in an amount of 1 to 200 ppm.

The specific surface area of the powder falls within the range of 10 to 40 $m^2/g$, and the coefficient of variation (the CV value (%)=100×standard deviation/average particle diameter) of the particle diameters computed from the TEM photograph is less than 30%.

There is also provided a dispersion obtained by dispersing the powder in a solvent. A paste obtained by adding a resin to the dispersion is also provided.

Advantageous Effects of Invention

The use of the methods disclosed in the present description allows a large amount of a fine particle power having an average particle diameter of 5 to 100 nm as measured using a transmission electron microscope to be obtained. In addition, a dispersion and paste having good low-temperature sinterability can be obtained.

MODE(S) FOR CARRYING OUT THE INVENTION

Figure 1:
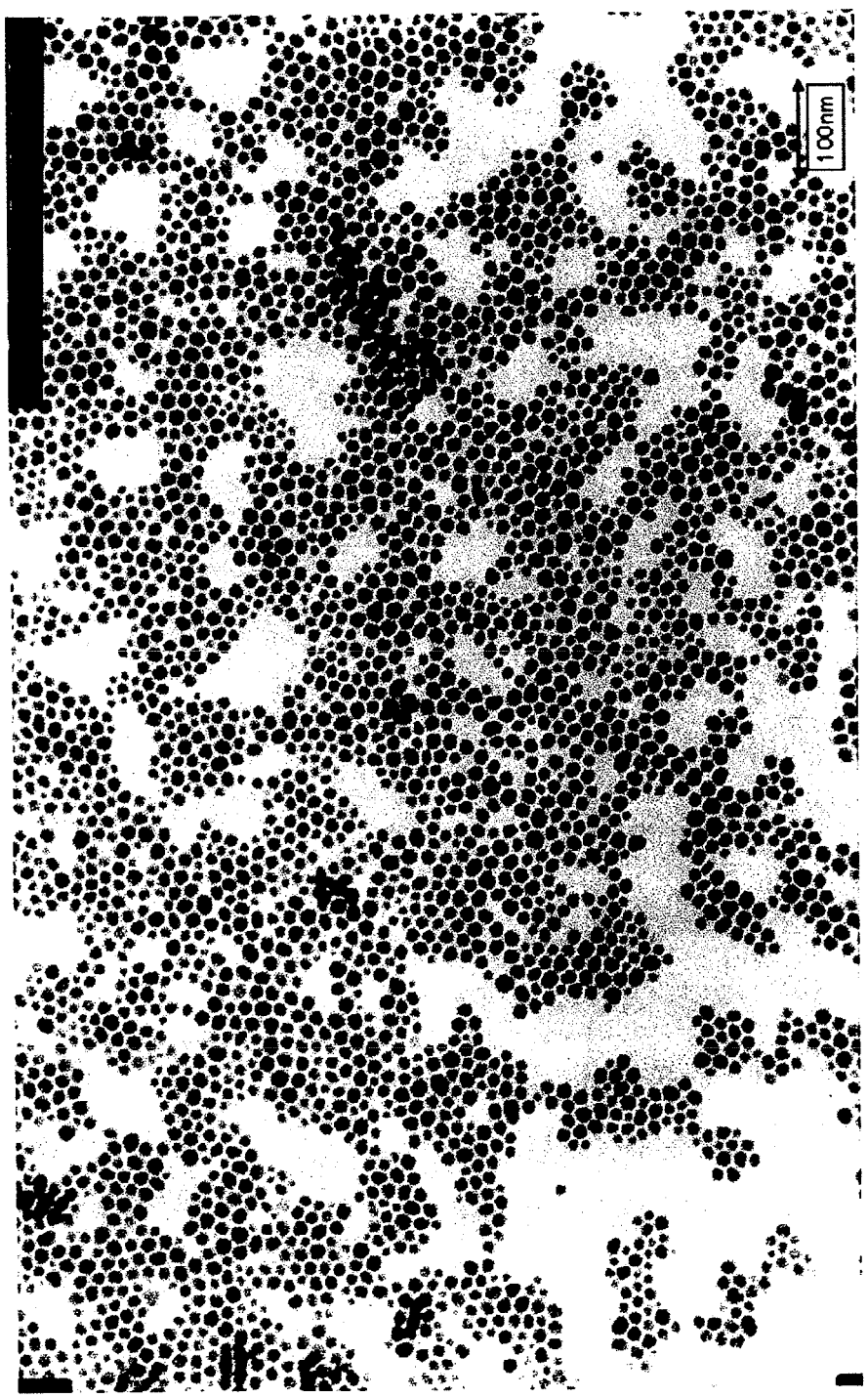
FIG. 1 is a TEM image of particles produced in Example 1, taken at a magnification of 174,000×.

Preferred embodiments of the present invention will next be described. The method for manufacturing silver particles of the present invention is a method for manufacturing silver particles to by mixing a solution of a silver compound, a protective agent, and a solution of a reducing agent in a reaction vessel to reduce the silver compound. The method is characterized in that a trace amount of copper is present in the reaction system. In the present description, a copper component means that one or a plurality of copper, copper compounds, and ionized copper are present.

In the present description, a step of causing the copper component to be present in the mixed solution when the silver ion in the solution is reduced to silver by the reaction with the reducing agent is referred to as a copper adding step. In this step, it is sufficient to add a trace amount of copper. Therefore, a method in which a solution of a known concentration is prepared and added to the reaction system is preferably used at some reaction scale. When the reaction scale is large, a method can be used in which a raw material such as a nitrate is directly added. However, after the addition, stirring must be continued until a uniform mixture is obtained. This method may include the operation of, after the addition operation, increasing the temperature of the reaction mixture.

In the method according to the present invention, it is sufficient that copper be present before completion of the reaction. However, it is preferable to allow the copper to be present in the solution from the beginning of the reaction so that a uniform particle diameter is obtained. Almost no copper is captured in the particles or the reaction product. Therefore, although no particular limitation is imposed on the form of copper present in the solution, it is preferable that copper be present in a dissolved state, i.e., in an ionized state so that the copper is uniformly involved in the reaction. However, if massive copper, for example, is used, it is preferable to add means for avoiding the inclusion of copper as an impurity in the final stage.

The copper component may be added to at least one of raw material solutions, such as the silver compound solution, the protective agent, the reducing agent solution, a solution mixture of the silver compound solution and the protective agent, and a solution mixture of the reducing agent solution and the protective agent, which are prepared before the reduction reaction is performed. Alternatively, the copper component may be added during a period after the raw material solutions are mixed to initiate the reduction reaction until the reaction is completed.

In some cases, the reduction reaction can be completed in a short time such as several minutes. Therefore, when the copper component is added during the reduction reaction, it is preferable that raw materials having weak reducing power be selected to perform the reaction. In the present invention, the completion of the reaction means the time at which the reaction of unreduced silver ion no longer occurs when the reducing agent is added to a solution sampled from the reaction mixture.

In the present invention, the effects of the copper component are saturated when the amount added is equal to or more than a is predetermined amount. Also, in the present invention, the copper component is present in the solution before the reduction operation. Therefore, if the amount of the copper component added is more than necessary, the copper component is also reduced, and this may cause the copper component to be present as an impurity. Therefore, the presence of a large amount of copper regarded as an impurity is not preferred when very fine particles are formed as in the present invention. The amount of the copper component relative to the added amount of silver is, at most, less than 1,000 ppm, preferably less than 500 ppm, and more preferably less than 200 ppm.

An organic material is used in the present invention with which the surfaces of the nanoparticles are coated. If the organic material is a liquid at room temperature, its boiling point is 250° C. or less, preferably 200° C. or less, and more preferably 150° C. or less. If the organic material is a powder at room temperature, the above boiling point may be read as the decomposition point or the sublimation point. When an obtained powder is used in electronic device applications, it is important that no impurities are mixed in the powder, and therefore it is preferable that the structure of the protective agent be as simple as possible. More preferably, the protective agent has a carboxyl group or a hydroxyl group in its structure.

Preferably, the protective agent is added uniformly as much as possible, and therefore the protective agent in solution form is preferably added. Alternatively, it is preferable that the protective agent be soluble in water to some extent. If a material not easily soluble in water is used, for example, a solution prepared by dissolving the protective agent in ethanol easily miscible with water may be used and added, so long as the solution has no influence on the reaction. When the protective agent is dissolved, ammonia water, for example, used as a pH adjusting agent or a solubilizing aid may be added to the solution.

No particular limitation is imposed on the protective agent used in the present invention, so long as it has the properties described above. Examples of the protective agent include materials having lengths comparable to the lengths of pentanoic acid, hexanoic acid, heptanoic acid, octanoic acid, benzoic acid, salicylic acid, m-hydroxybenzoic acid, and p-hydroxybenzoic acid. The molar ratio of the added amount of the protective agent to the amount of silver (the number of moles of the molecules of the protective agent/the number of moles of silver) is preferably 0.1 to 4.0. If the molar ratio of the protective agent is less than 0.1, the amount of the protective agent is too small relative to the amount of silver, and therefore coagulation of particles can occur frequently.

If the molar ratio of the protective agent to silver exceeds 4.0, the amount of the protective agent with which the periphery of silver in the product obtained is coated is too large. This indicates that the possibility that a large amount of the impurity remains in the produced final silver composition is high, which is not preferred because a high-purity silver film may not be easily obtained. Therefore, the molar ratio of the added amount of the protective agent to the amount of silver is preferably in the range of 0.1 to 3.0 and more preferably 0.3 to 2.0.

No particular limitation is imposed on the reducing agent, so long as it can reduce silver ions to silver. Any of widely used conventional materials such as sodium borohydride, hydrazine, L-ascorbic acid, hydroquinone, gallic acid, formalin, phosphine, gluconic acid, and their derivatives may be used.

Preferably, the amount of the added reducing agent is in the range of 0.5 to 9.0 equivalents relative to silver, preferably 0.5 to 8.0 equivalents, and more preferably 1.0 to 7.0 equivalents. The use of the reducing agent in an amount of less than 0.5 equivalents is not preferred because unreduced silver ion may remain. If the amount exceeds 9.0 equivalents, the amount of the reducing agent is too large, and the reaction can proceed at an excessively fast rate. Therefore, the number of coagulated particles increases, and the variations in the diameter of the final particles can be large, which is not preferred.

The raw material solutions in the present invention will next be described. The silver compound solution described above is a solution prepared by dissolving a silver compound in a solvent. A suitable silver compound may be appropriately selected according to the type of the solvent. For example, when water is used as the solvent, silver nitrate, silver acetate, silver carbonate, and the like can be preferably used.

The feed concentration of silver must be appropriately changed in relation to the adjustment of the amounts of other components. For example, even within the above range of the reducing agent, an excessively high silver concentration is not preferred because the reaction proceeds at once and this may cause safety problems such as boil over. An excessively low silver concentration is also not preferred because problems in productivity occur. Therefore, the feed concentration of silver is within the range of preferably 0.01 to 1.0 mol/L, more preferably 0.01 to 0.75 mol/L, and particularly preferably 0.01 to 0.50 mol/L.

Preferably, oxygen dissolved in the solutions is removed as much as possible to achieve uniform reactivity. More specifically, the dissolved oxygen can be removed by bubbling an inert gas such as nitrogen through each solution before the reaction.

Preferably, the method for manufacturing the silver particles is performed within the range of 40 to 80° C. If the temperature is less than 40° C., the degree of supersaturation of silver is high. Therefore, an excessively large number of nuclei of the product are generated, and the size of the primary particles is reduced. Primary particles having small diameters can easily aggregate. Therefore, the coagulation of the particles is more likely to occur, and the differences in particle diameter and shape between single particles and coagulated particles can become large, which is not preferred. In addition, if the temperature of the reaction system is excessively low, silver ion is not sufficiently reduced, and this can cause a reduction in yield.

If the reaction temperature is excessively high, the reaction proceeds rapidly. Such a rapid reaction is not preferred because coagulation as well as reduction can proceed, and this can cause variations in particle diameter and shape.

To "perform the reduction reaction at 40 to 80° C.," solutions to be fed to a reaction vessel may be pre-heated to 40 to 80° C. In an alternative method, a solution in the reaction vessel is pre-heated to 40 to 80° C., and other solutions at 40 to 80° C. are fed to the reaction vessel. More specifically, it is preferable to perform temperature control such that the addition of a solution does not cause an abrupt change in temperature.

Particles with a uniform diameter can be formed by allowing the reduction reaction to proceed at once. Therefore, it is preferable to add the reducing agent described above at once. The same also applies if the silver solution is added to a solution to which the reducing agent is added in advance. If the production scale is large and the reaction vessel used has a large solution depth, a method may be used in which a solution to be added is pressurized and then added into a receiving solution so that the uniformity of the reaction is ensured.

The thus obtained particles are in an appropriately coagulated form. Therefore, such particles can be sufficiently separated and collected using a method such as a filter press generally used to collect particles of the order of micrometers, without using an extremely small mesh filter.

The particles obtained may be washed with water such as pure water to remove any unnecessary component in the reaction mixture. Then a drying step of removing water may be performed to obtain a powder. The drying in the drying step is performed at preferably 100° C. or lower and more preferably 80° C. or lower. If the drying temperature is too high, the particles are sintered, and it is therefore difficult to obtain silver particles that maintain their primary particle form.

Next, a detailed description is given of the silver particles that can be produced by the manufacturing method of the present invention. With the manufacturing method of the present invention, nano-sized silver particles with a uniform diameter can be obtained irrespective of the scale of the reaction. The diameters of the silver particles mean primary particle diameters measured from a TEM image by a measurement method described later. Preferably, the silver particles according to the present invention have an average primary particle diameter within the range of 1 to 100 nm. If the average primary particle diameter is less than 1 nm, the cohesive force of the particles is excessively strong, and it is therefore difficult to prevent the occurrence of coagulation of the particles. If the average primary particle diameter exceeds 100 nm, low-temperature sinterability deteriorates, and therefore the silver particles of the present invention are not suitable for metal trace applications and other applications in which the silver particles are expected to be used.

One of the characteristics of the present invention, i.e., the variations in diameter of the particles, will next be described. Generally, a coefficient of variation (CV value) obtained by dividing the standard deviation of the average primary particle diameter measured from a TEM image by the average particle diameter is used as the indicator of the variations in diameter of the particles. For the silver particles according to the present invention, the coefficient of variation of the obtained particles is less than 30%, and is sometimes less than 25%. The coefficient of variation of 30% or more indicates large variations in diameter of the particles and is therefore not preferred.

The silver particle powder of the present invention can have a specific surface area of 10 to 40 $m^2/g$ as measured by the BET method. To utilize the silver particle powder in a dispersion (also referred to as an ink) or a paste, the specific surface area of the powder may be 15 to 40 $m^2/g$ and may be 20 to 30 $m^2/g$ to use the powder more preferably. According to the present invention, the specific surface area can fall within any of the above ranges.

To obtain a silver particle powder in any of the above ranges, a copper adding step of adding a trace amount of copper to the reaction mixture is provided. This step is the feature of the present invention. In conventional fine particles, such a specific surface area is rarely observed, and the specific surface area is, at most, less than 10 $m^2/g$. (For example, a 20 nm silver powder disclosed in an Example in Japanese Patent Application Laid-Open No. 2006-216389 has a BET of 5.7 $m^2/g$.) As can be seen from this fact, although the conventional primary particles are fine, strong coagulation of the particles can occur, and therefore the specific surface area is small. However, the particles according to the present invention are appropriately separated from each other. Therefore, the particles obtained have a high BET value. Also from this fact, it can be understood that the particles provided by the present invention are very distinctive.

The reason that such a phenomenon occurs is not well understood in detail. The reaction state when copper was added was compared with the reaction state when no copper was added. It was found that the reaction rate when copper was added was significantly higher and the reaction was completed significantly faster. According to the estimation from the amount of copper contained in the final product, the copper component may act like a catalyst.

The control of the specific surface area of the particle powder will next be described. A conventional method such as adjustment of the amount of the reducing agent and the reaction temperature may be used to control the specific surface area of the particle powder. However, according to the studies by the present inventors, a dry silver particle powder having a specific surface area of 5.0 $m^2/g$ or more could not be obtained by changing the reaction conditions.

The present inventors have made further studies and found that the value of the specific surface area can be controlled by adjusting the amount of copper added during manufacturing. A high BET value can be obtained by increasing the addition amount, while the particle diameters remain almost unchanged.

This is advantageous for the design of a dispersion or a paste. The viscosity of a dispersion or a paste must be changed depending on its application or a printing method. In general methods of adjusting the viscosity, the viscosity is adjusted by adjusting the specific surface area, adding an additive, or adjusting the amount of a solvent added. Of these methods, the addition of an additive composed of a viscosity modifier can cause impurities to remain in a film. Therefore, in applications requiring conductivity, the use of such an additive is limited. With the method in which the added amount of the solvent is adjusted, a small difference in the amount can change the product. Therefore, this method is also not easily applied to a dispersion or paste having a desired viscosity.

The method in which the specific surface area is changed is most preferable to adjust the viscosity. According to the present invention, the above demand can be met. This suggests that the present invention can be applied to various applications and is preferred.

A specific operational mechanism will be described. When the specific surface area of a particle powder is large, the amount of a solvent in contact with the surfaces of the particles is large. Therefore, the amount of the solvent not in contact with the surfaces of the particles decreases, and this results in an increase in viscosity. Also in this possible mechanism, when the surface area of the particle powder is small, the amount of a solvent in contact with the surfaces of the particles is small. Therefore, the amount of the solvent in a free state increases, and this results in a decrease in viscosity.

The silver particles formed by the method according to the present application contain copper in the range of 1 to 1,000 ppm relative to the amount of silver, which is a feature of the reaction. If the detected amount is less than 1 ppm, it can be said that the product was not manufactured by the method according to the present invention. In fact, if a wet process is used under the above conditions, the diameters of the produced particles are not uniform. If the detected amount exceeds 1,000 ppm, this shows that the particles contain a large amount of copper as an impurity, and the conductivity may be adversely affected. Therefore, this is not suitable for applications in which high conductivity is expected. Accordingly, the amount of copper detected in the silver particles of the present invention is within the range of 1 to 1,000 ppm relative to silver, preferably 1 to 500 ppm relative to silver, and more preferably 1 to 300 ppm relative to silver.

The particles obtained in the above-described manner can be used for a dispersion (ink) together with, for example, a dispersion solvent described later or for a paste together with a resin added. Such a dispersion or paste can be used for coating and printing using any of various printing devices suitable for the adjusted viscosity. The dispersion of the present invention is a liquid including the silver particles of the present invention dispersed in a solvent.

In one preferred embodiment of the present invention, coagulation and sedimentation occur after the reaction, and the solid and liquid can be easily separated from each other. In addition, the powder obtained can be re-dispersed in various solvents. Examples of the dispersion solvent that can be used for re-dispersion include water, alcohols, polyols, glycol ethers, 1-methyl pyrrolidinone, pyridine, terpineol, butyl carbitol, butyl carbitol acetate, texanol, and phenoxypropanol.

The addition of one or both of an appropriate binder and an appropriate dispersant together with the dispersion solvent is also preferred in order to improve the dispersibility and thixotropy of the dispersion. The binder is a component that is necessary to impart dispersibility and independence to the particles and therefore must have at least affinity to the solvent and particles. A binder that can increase dispersibility but is not discharged to the outside of the system during sintering is not suitable for the object of the present invention. More specifically, a binder having a decomposition or volatilization temperature of 250° C. or less is more preferably selected. Any commercial organic or inorganic binder and dispersant can be preferably used so long as they have at least the above properties. They can be used alone or in combination of two or more types.

Specific examples of the organic binder that can be used include acrylic resins, polyester resins, epoxy resins, phenol resins, phenoxy resins, DAP resins, urethane resins, fluorocarbon resins, polyimide resins, polyamide resins, silicone resins, polyolefin resins, ethyl cellulose, and polyvinyl alcohols. Specific examples of the inorganic binder that can be used include silica sol, alumina sol, zirconia sol, and titania sol.

Although specific names are listed below, the use of materials not listed below is not excluded, so long as they have the above properties. Examples of the acrylic resin include: BR-102, BR-105, BR-117, BR-118, BR-1122, and MB-3058 (products of MITSUBISHI RAYON Co., Ltd.); and ARUFON UC-3000, ARUFON UG-4010, ARUFON UG-4070, ARUFON UH-2041, ARUFON UP-1020, ARUFON UP-1021, and ARUFON UP-1061 (products of TOAGOSEI Co., Ltd.). Examples of the polyester resin include: VYLON 220, VYLON 500, and VYLON UR1350 (products of TOYOBO Co., Ltd.); and MALKYD No1 (product of Arakawa Chemical Industries, Ltd.). Examples of the epoxy resin include: ADEKARESIN EP-4088S and ADEKARESIN EP-49-23 (products of ADECA CORPORATION); and 871 (product of JAPAN EPDXY RESINS Co., Ltd.). Examples of the phenol resin include RESITOP PL-4348 and RESITOP PL-6317 (products of Gunei Chemical Industry Co., Ltd.). Examples of the phenoxy resin include: 1256 and 4275 (products of JAPAN EPDXY RESINS Co., Ltd.); and TAMANOL 340 (product of Arakawa Chemical Industries, Ltd.). Examples of the DAP resin include DAP A and DAP K (products of DAISO Co., Ltd.). Examples of the urethane resin include MILLIONATE MS-50 (product of Nippon Polyurethane Industry Co., Ltd.). Examples of the ethyl cellulose include ETHOCEL STANDARD 4, ETHOCEL STANDARD 7, ETHOCEL STANDARD 20, and ETHOCEL STANDARD 100 (products of Nisshin & Co., Ltd.). Examples of the polyvinyl alcohol include RS-1713, RS-1717, and RS-2117 (products of KURARAY Co., Ltd.).

Any general commercial dispersant is sufficient so long as it has affinity to the surfaces of the particles and affinity to a dispersion medium. A single dispersant or any combination of dispersants may be used.

Representative examples of the dispersant include: low-molecular weight anionic compounds such as fatty acid salts (soap), α-sulfo fatty acid ester salts (MES), alkylbenzene sulfonates (ABS), linear alkylbenzene sulfonates (LAS), alkyl sulfates (AS), alkyl ether sulfates (AES), and triethanol alkyl sulfates; low-molecular weight nonionic compounds such as fatty acid ethanol amides, polyoxyethylene alkyl ethers (AE), polyoxyethylene alkyl phenyl ethers (APE), sorbitol, and sorbitan; low-molecular weight cationic compounds such as alkyl trimethyl ammonium salts, dialkyl dimethyl ammonium chlorides, and alkyl pyridinium chlorides; low-molecular weight amphoteric compounds such as alkyl carboxyl betaines, sulfobetaine, and lecithin; high-molecular weight aqueous dispersants represented by naphthalene sulfonate formalin condensates, polystyrene sulfonates, polyacrylates, salts of copolymers of vinyl compounds and carboxylic acid-based monomers, carboxymethyl cellulose, polyvinyl alcohols, and the like; high-molecular weight non-aqueous dispersants such as partial alkyl-esters of polyacrylic acid and polyalkylene polyamines; and high-molecular weight cationic dispersants such as polyethyleneimine and aminoalkyl methacrylate copolymers. However, any dispersant having a structure other than those exemplified above is not excluded, so long as it can be preferably applied to the particles of the present invention.

Specific names of the know dispersants are listed below. Examples of the know dispersants include: FLOWLEN DOPA-15B and FLOWLEN DOPA-17 (products of KYOEISHA CHEMICAL Co., Ltd.); Solplus AX5, Solplus TX5, Solsperse 9000, Solsperse 12000, Solsperse 17000, Solsperse20000, Solsperse21000, Solsperse24000, Solsperse26000, Solsperse27000, Solsperse28000, Solsperse32000, Solsperse35100, Solsperse 54000, and Solthix 250 (products of The Lubrizol Corporation); EFKA4008, EFKA4009, EFKA4010, EFKA4015, EFKA4046, EFKA4047, EFKA4060, EFKA4080, EFKA7462, EFKA4020, EFKA4050, EFKA4055, EFKA4400, EFKA4401, EFKA4402, EFKA4403, EFKA4300, EFKA4330, EFKA4340, EFKA6220, EFKA6225, EFKA6700, EFKA6780, EFKA6782, and EFKA8503 (products of EFKA Additives B.V.); AJISPER PA111, AJISPER PB711, AJISPER PB821, AJISPER PB822, AJISPER PN411, and FAMEX L-12 (products of Ajinomoto Fine-Techno Co., Inc.); TEXAPHOR-UV21 and TEXAPHOR-UV61 (products of Cognis Japan); DisperBYK101, DisperBYK102, DisperBYK106, DisperBYK108, DisperBYK111, DisperBYK116, DisperBYK130, DisperBYK140, DisperBYK142, DisperBYK145, DisperBYK161, DisperBYK162, DisperBYK163, DisperBYK164, DisperBYK166, DisperBYK167, DisperBYK168, DisperBYK170, DisperBYK171, DisperBYK174, DisperBYK180, DisperBYK182, DisperBYK192, DisperBYK193, DisperBYK2000, DisperBYK2001, DisperBYK2020, DisperBYK2025, DisperBYK2050, DisperBYK2070, DisperBYK2155, DisperBYK2164, BYK220S, BYK300, BYK306, BYK320, BYK322, BYK325, BYK330, BYK340, BYK350, BYK377, BYK378, BYK380N, BYK410, BYK425, and BYK430 (products of BYK Japan KK); DISPARLON 1751N, DISPARLON 1831, DISPARLON 1850, DISPARLON 1860, DISPARLON 1934, DISPARLON DA-400N, DISPARLON DA-703-50, DISPARLON DA-725, DISPARLON DA-705 DISPARLON DA-7301, DISPARLON DN-900, DISPARLON NS-5210, DISPARLON NVI-8514L, HIPLAAD ED-152, HIPLAAD ED-216, HIPLAAD ED-251, and HIPLAAD ED-360 (Kusumoto Chemicals, Ltd.); FTX-207S, FTX-212P, FTX-220P, FTX-220S, FTX-228P, FTX-710LL, FTX-750LL, FTERGENT 212P, FTERGENT 220P, FTERGENT 222F, FTERGENT 228P, FTERGENT 245F, FTERGENT 245P, FTERGENT 250, FTERGENT 251, FTERGENT 710FM, FTERGENT 730FM, FTERGENT 730LL, FTERGENT 730LS, FTERGENT 750DM, and FTERGENT 750FM (products of NEOS COMPANY LIMITED); AS-1100, AS-1800, and AS-2000 (products of TOAGOSEI Co., Ltd.), KAOCER 2000, KAOCER 2100, KDH-154, MX-2045L, HOMOGENOL L-18, HOMOGENOL L-95, RHEODOL SP-010V, RHEODOL SP-030V, RHEODOL SP-L10, and RHEODOL SP-P10 (products of Kao Corporation); EPAN U103, SHALLOL DC902B, NOIGEN EA-167, PLYSURF A219B, and PLYSURF AL (products of DAI-ICHI KOGYO SEIYAKU Co., Ltd.); MEGAFAC F-477, MEGAFAC 480SF, and MEGAFAC F-482 (products of DIC corporation); SILFACE SAG503A and DYNOL 604 (products of Nissin Chemical Co., Ltd.); SN SPERSE 2180, SN SPERSE 2190, and SN LEVELER S-906 (products of SAN NOPCO LIMITED); and S-386 and S-420 (products of AGC SEIMI CHEMICAL Co., Ltd.).

Any appropriate mechanical dispersion treatment may be used during preparation of the dispersion. Any known method may be used for the mechanical dispersion treatment, provided that the particles are not significantly modified. Specific examples include ultrasonic dispersion, a dispersion mill, a triple roll mill, a ball mill, a bead mill, a biaxial kneader, and a planetary mixer. These may be used alone or in combination of two or more.

The use of the above constitution can provide good properties, i.e., good low-temperature sinterability. The bulk resistance of silver is 1.6 $\mu\Omega \cdot cm$. The use of the particles according to the present invention can give a resistance value close to the bulk resistance even when the firing temperature is about 250° C. It is appreciated that the constitution of the dispersion described layer, particularly, the decomposition points and boiling points of the dispersion medium and additives must be taken into consideration in order to provide the above properties.

The measurement methods used in the present invention will next be described. The following measurement methods can be used for the evaluation of the silver particles of the present invention without modification.

(Measurement of Average Value of Primary Particle Diameters from TEM Image)

2 Parts by mass of a dry silver particle powder was added to a solution mixture of 96 parts by mass of cyclohexane and 2 parts to by mass of oleic acid, and the silver particles were dispersed ultrasonically. The dispersion was added dropwise onto a Cu micro-grid with supporting film and then dried to obtain a TEM sample. The produced micro-grid was observed under a transmission electron microscope (JEM-100CX Mark-II, product of JEOL Ltd.) at an acceleration voltage of 100 kV, and bright field images of the particles were captured at magnifications of 30,000× and 174,000×.

To compute the average primary particle diameter, image analysis software ("A-zou-kun (registered trademark)," product of Asahi Kasei Engineering Corporation) was used. This image analysis software can identify individual particles using color concentrations, and the TEM image at 174,000× was subjected to circular particle analysis under the conditions with "lightness of particles" set to "dark," "noise reduction filter" set to "yes," "circularity threshold value" set to "20," and "overlapping degree" set to "50" to measure the average primary particle diameter. When a large number of coagulated particles and irregular particles were present in a TEM image, the average primary particle diameter was unmeasurable. The average primary particle diameter determined in the above manner is referred to as an average particle diameter (or "$D_{TEM}$").

(Computation of Coefficient of Variation from Primary Particle Diameters)

The average value and standard deviation were computed from the measurement values of at least 1,000 particles by the above measurement method, and the value obtained by dividing the standard deviation by the average value was computed as a coefficient of variation.

(Measurement of Amount of Copper in Silver Particle Powder)

If the silver component remains present, analysis errors can occur. Therefore, to remove the silver component, the following pre-treatment was performed. A 300 mL conical beaker is charged with 10 g of a silver particle powder. Then 15 mL of a nitric acid solution is added thereto to dissolve the silver particle powder. The resultant solution is heated on a hot plate at a preset temperature of 250° C. and is concentrated to the extent that evaporation to dryness is avoided. After the concentrated solution is left to cool, pure water is added thereto. The solution is checked to determine that no cloudiness and no suspended matter are observed. If cloudiness or suspended matter is found in the solution, the steps of addition of nitric acid, heat concentration, and natural cooling are repeated until the cloudiness or suspended matter disappears. Hydrochloric acid is added to the solution with no cloudiness and no suspended matter to produce silver chloride. Then the mixture is subjected to solid-liquid separation by filtration to separate the silver chloride from the filtrate, and the amount of copper in the filtrate was analyzed using ICP-MS (AGILENT7500i, product of Agilent Technologies, Inc.).

(Measurement of Specific Surface Area by BET Method)

0.2 g of a silver particle powder was subjected to pre-treatment in an $N_2$ atmosphere at 25° C. and 45 cc/min for 20 minutes, and the measurement was performed using 4S-U2 (product of Yuasa Ionics Inc.) or its equivalent.

(Measurement of TAP Density)

The measurement was performed using a measurement method described in Japanese Patent Application Laid-Open No. 2007-263860. This measurement method (TAP density measurement method) will be described briefly. A predetermined holder is filled with a powder used as a measurement object to form a powder layer. Then a pressure of 0.14 N/m$^2$ or more and 0.18 N/m$^2$ or less is applied to the powder layer, and the height thereof is measured. The density of the powder (measurement object) is determined from the measured value of the height of the powder layer and the weight of the packed powder.

(Production of Silver Particle-Containing Dispersion (Ink))

6 g of a produced silver particle powder and 14 g of terpineol 14 g were mixed. Then the mixture was treated using a dispersion mill at 1400 rpm for 90 minutes and subjected to a triple roll mill 10 times to produce a silver particle-containing dispersion.

(Production and Firing of Silver Coated Film and Measurement of Volume Resistance)

The produced silver particle-containing dispersion was applied to a glass slide using an applicator. Then the dispersion was fired in a dryer (product of Yamato Scientific Co., Ltd.) at 150° C. for 30 minutes. A sample fired at 200° C. for 30 minutes was also produced. The volume resistance per 1 μm thick of each fired film was measured using a resistivity meter (Loresta G P, product of Mitsubishi Chemical Analytech Co., Ltd.), and the thickness of the film was measured using a surface roughness meter (SURFCOM 1500D, product of TOKYO SEIMITSU Co., Ltd.) to compute the volume resistance of the film.

(Evaluation of Dispersibility of Particles)

An obtained silver particle powder was added to a solvent and a dispersant to prepare a dispersion, and the dispersibility of the particles in the solvent was determined.

In a specific method, 1.0 g of the silver particle powder, 10.0 g of butyl carbitol acetate (product of Wako Pure Chemical Industries, Ltd.), and 0.1 g of DisperBYK2020 (product of BYK Japan KK) used as the dispersant were weighed and mixed in a test tube, and the powder was dispersed using an ultrasonic disperser for 10 minutes to produce a dispersion. The dispersed state of the particles in the obtained solution was visually observed to determine the dispersibility of the powder in the solvent.

(Estimation of Surface Coating Material)

The type of the surface coating organic material can be determined by heating the particles, the dispersion, or a paste at a temperature equal to or lower than the decomposition temperature of the coating organic material, for example, at about 150° C. for about 30 minutes, collecting the generated gas, and analyzing the gas by gas chromatography/mass spectrography (GC/MS).

EXAMPLES

The present invention will next be specifically described by way of Examples. For Examples 1 to 7 and Comparative Examples 1 and 3 to 7, the examination results obtained at 5 L scale were shown. For Examples 8 to 13 and Comparative Example 2, the examination results obtained at 200 L scale were shown.

Example 1

A 5 L beaker was used (Examples 1 to 7 and Comparative Examples 1 to 7), and a stirring rod with stirring blades was placed at the center of a reaction vessel. A thermometer for monitoring temperature was placed in the reaction vessel, and a nozzle was also placed in the reaction vessel so that nitrogen could be supplied from its lower part to a solution. An apparatus configured as described above is referred to as a reaction vessel A.

First, the reaction vessel A was charged with 3,400 g of water, and nitrogen was fed from the lower part of the reaction vessel at a flow rate of 3,000 mL/min for 600 seconds to remove remaining oxygen. Then nitrogen was fed from the upper part of the reaction vessel at a flow rate of 3,000 mL/min to form a nitrogen atmosphere in the reaction vessel. Next, the temperature of the solution in the reaction vessel was adjusted to 60° C. under stirring. Then 7 g of ammonia water containing 28 percent by mass of ammonia was fed to the reaction vessel, and the mixture was stirred for 1 minute to make the solution uniform.

Next, 45.5 g of hexanoic acid (product of Wako Pure Chemical Industries, Ltd.) used as a protective agent was added (the amount corresponding to a molar ratio of 1.98 relative to silver), and the mixture was stirred for 4 minutes to dissolve the protective agent. Then 23.9 g of a 50 mass % aqueous solution of hydrazine hydrate (product of Otsuka Chemical Co., Ltd.) used as a reducing agent was added (the amount corresponding to 4.82 equivalents relative to silver), and the resultant mixture was used as a reducing agent solution.

33.8 g of silver nitrate crystals (product of Wako Pure Chemical Industries, Ltd.) were dissolved in 180 g of water in another vessel to prepare an aqueous silver nitrate solution, and this solution was used as an aqueous silver salt solution. Copper nitrate trihydrate (product of Wako Pure Chemical Industries, Ltd.) was added to the aqueous silver salt solution in an amount of 1 ppm in terms of copper relative to silver. The addition of the copper nitrate trihydrate was adjusted by preparing an aqueous copper nitrate trihydrate solution of a known concentration in advance and adding a diluted solution of the prepared solution. The temperature of the aqueous silver salt solution was adjusted to the same temperature as the temperature of the reducing agent solution in the reaction vessel, i.e., to 60° C.

Next, the entire amount of the aqueous silver salt solution was added to and mixed with the reducing agent solution at once to initiate a reduction reaction. During the reduction reaction, the color of the slurry was changed immediately after completion of the addition. Stirring was continuously performed, and the mixture was aged for 10 minutes under continuous stirring. Then the stirring was stopped, and the mixture was subjected to solid-liquid separation by suction filtration. The solid was washed with pure water until the electric conductivity of the washing waste water became less than 2.0 μS/cm. Then the resultant solid was dried at 40° C. for 12 hours to give a fine silver particle powder. Since the obtained powder has high sensitivity to heat, drying at a temperature equal to or higher than 40° C. can result in bulky silver.

Examples 2 to 5

Example 1 was repeated except that the amount of copper added relative to silver was changed to different values. The properties and the like of the particles obtained are shown in Table 1.

Examples 6 and 7

The type of copper was changed, and the amount added was also changed. The reaction apparatus and the reaction flow were unchanged. The properties and the like of the particles obtained are also shown in Table 1.

Example 8

A stainless steel-made reaction vessel of a volume of 200 L (Examples 8 to 13 and Comparative Example 2) was prepared, and a stirring rod, a thermometer, and a nitrogen nozzle were placed as in the reaction vessel A (5 L reaction vessel) to configure a reaction vessel B.

First, the reaction vessel was charged with 137 kg of water, and nitrogen was fed from the lower part of the reaction vessel at a flow rate of 20 L/min for 600 seconds to remove remaining oxygen. Then nitrogen was fed from the upper part of the reaction vessel at a flow rate of 20 L/min to form a nitrogen atmosphere in the reaction vessel. Next, the temperature of the solution in the reaction vessel was adjusted to 60° C. under stirring. Then 282.3 g of ammonia water containing 28 percent by mass of ammonia was fed to the reaction vessel, and the mixture was stirred for 1 minute to make the solution uniform.

Next, 1818.8 g of hexanoic acid (product of Wako Pure Chemical Industries, Ltd.) used as a protective agent was added (the amount corresponding to a molar ratio of 1.98 relative to silver), and the mixture was stirred for 4 minutes to dissolve the protective agent. Then 596.3 g of an 80 mass % aqueous solution of hydrazine hydrate (product of Otsuka Chemical Co., Ltd.) used as a reducing agent was added (the amount corresponding to 4.82 equivalents relative to silver), and the resultant mixture was used as a reducing agent solution.

1,350.3 g of silver nitrate crystals (product of Wako Pure Chemical Industries, Ltd.) were dissolved in 7,200 g of water in another vessel to prepare an aqueous silver nitrate solution, and this solution was used as an aqueous silver salt solution. 0.0325 g of copper nitrate trihydrate (product of Wako Pure Chemical Industries, Ltd.) was added to the aqueous silver salt solution (the amount corresponding to 10 ppm in terms of copper relative to silver). The temperature of the aqueous silver salt solution was adjusted to the same temperature as the temperature of the reducing agent solution in the reaction vessel, i.e., to 60° C.

Next, the entire amount of the aqueous silver salt solution was added to and mixed with the reducing agent solution at once to initiate a reduction reaction. Stirring was continuously performed, and the mixture was aged for 10 minutes under continuous stirring. Then the stirring was stopped, and the mixture was subjected to solid-liquid separation using a filter press. The solid was washed with pure water until the electric conductivity of the washing waste water became less than 2.0 μS/cm. Then the resultant solid was dried at 40° C. for 12 hours to give a fine silver particle powder.

The obtained particles were added to a dispersing solution containing butyl carbitol acetate and DisperBYK-2020. The produced solution was subjected to dispersion by the above-described method, and the state of the solution was observed. In the thus-produced dispersion, no precipitation occurred even immediately after mixing, and no precipitation was found in the dispersion after even 24 hours. This shows that the particles of the present invention had good re-dispersibility in butyl carbitol acetate.

Examples 9 to 13

Example 8 was repeated except that the amount of copper relative to silver was changed to different values. The properties and the like of the particles obtained are also shown in Table 1.

Example 14

3.9 g of phenol resin RESITOP PL-4348 (solid content: 77.5 wt %, product of Gunei Chemical Industry Co., Ltd.) used as a resin was dissolved in 14.0 g of terpineol, and then 1.3 g of a polymer-based pigment dispersant AJISPER PA111 (product of Ajinomoto Fine-Techno Co., Inc.) was dissolved in the prepared solution. 94.3 g of silver particles with an average primary particle diameter of 20 nm that were coated with hexanoic acid (number of carbon atoms: 6) and prepared as in Example 8 were added to the resultant solution, and the mixture was mixed for 10 minutes under manual stirring to give a conductive paste.

Traces were drawn with the produced conductive paste using a screen printer (MT-320T, product of Microtek Inc.). More specifically, traces with a line width of 300 μm and a line length of 42 mm and traces with a line width of 80 μm and a line length of 20 mm were drawn on a glass substrate using a screen printing plate for the traces (product of SONOCOM Co., Ltd., stainless steel made, 250 mesh, emulsion thickness: 30 μm), and the substrate after drawing was heated in an oven (DKM400, product of Yamato Scientific Co., Ltd.) in air at 200° C. for 60 minutes to produce a sample. The specific resistance was evaluated on the produced sample. A thin film having good conductivity (specific resistance: 8.7 Ω·cm) was obtained.

Example 15

Example 14 was repeated except that 5.0 g of acrylic resin BR-102 (product of MITSUBISHI RAYON Co., Ltd.) used as a resin was prepared and dissolved in 44.0 g of terpineol (product of Wako Pure Chemical Industries, Ltd.) used as a dispersion medium, and 95.0 g of silver particles with an average primary particle diameter of 20 nm that were coated with hexanoic acid (number of carbon atoms: 6) and prepared as in Example 8 were added to the resultant solution. A thin film having good conductivity (specific resistance: 7.7 Ω·cm) was obtained.

Comparative Example 1

Example 1 was repeated except that copper was not added. The properties and the like of the particles obtained are also shown in Table 1.

Comparative Example 2

Comparative Example 1 was repeated except that the amount of the hydrazine hydrate used as the reducing agent was changed to 9.6 equivalents relative to silver. The color of the slurry was changed immediately after the start of the reduction reaction, indicating completion of the reaction.

Comparative Example 3

Comparative Example 1 was repeated except that after completion of the reduction reaction, an aqueous copper nitrate trihydrate solution was added in an amount of 6,000 ppm relative to silver and the mixture was stirred for 5 minutes.

Comparative Examples 4 and 5

Example 1 was repeated except that the amount of copper relative to silver was changed to different values. The properties and the like of the particles obtained are shown in Table 1.

Comparative Examples 6 and 7

The same reaction procedure as in Example 4 was repeated except that an aqueous solution of nickel nitrate hexahydrate (product of Wako Pure Chemical Industries, Ltd., Comparative Example 6) or an aqueous solution of iron (III) nitrate nonahydrate (product of Wako Pure Chemical Industries, Ltd., Comparative Example 7) was used as the added material and that the amount added of each material was 100 ppm as in Example 4. The properties and the like of the particles obtained are also shown in Table 1.

Comparative Example 8

Example 8 was repeated except that copper was not added. The properties and the like of the particles obtained are also shown in Table 1.

Figure 2:
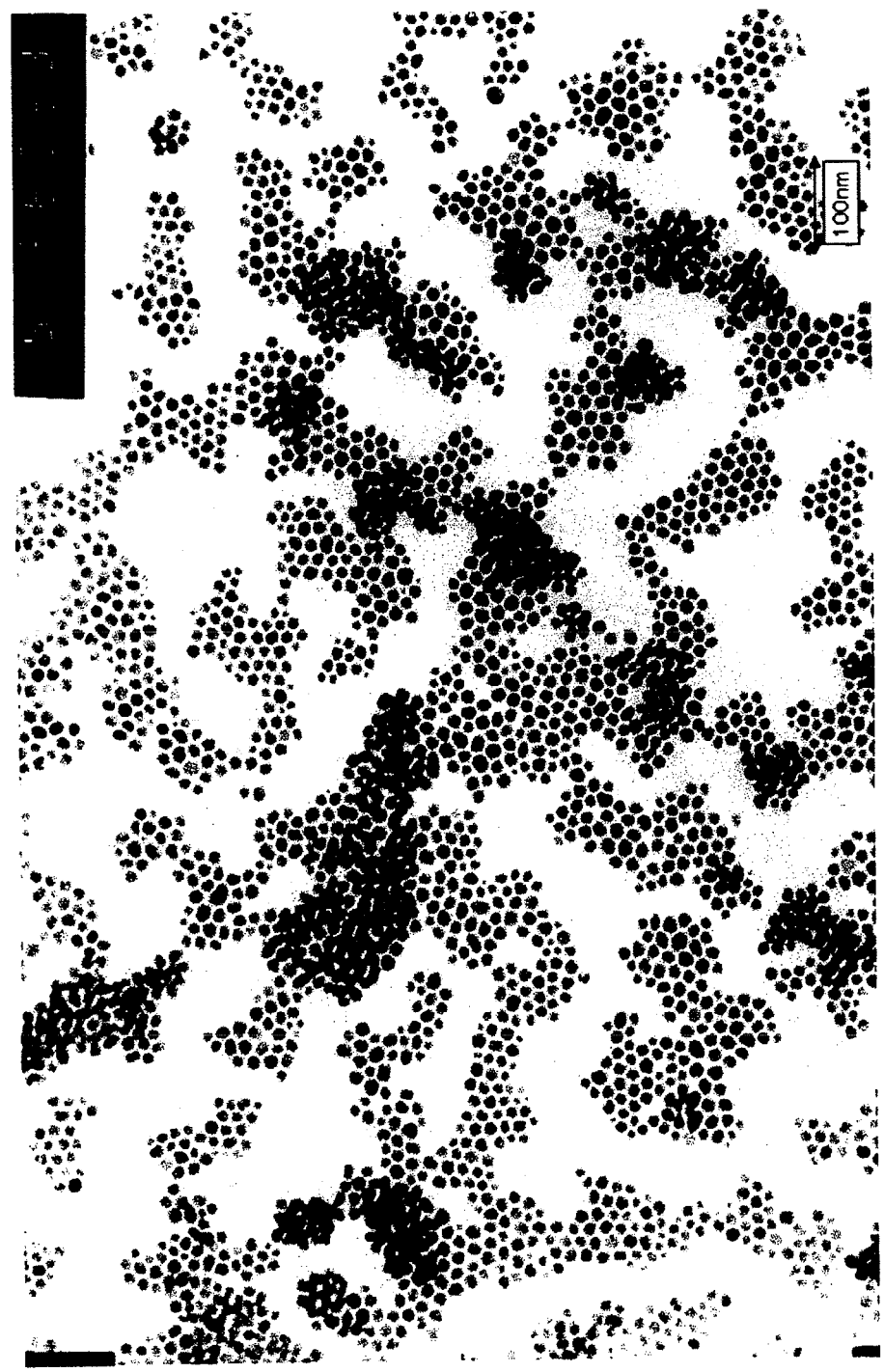
FIG. 2 is a TEM image of particles produced in Example 3, taken at a magnification of 174,000×.
Figure 3:
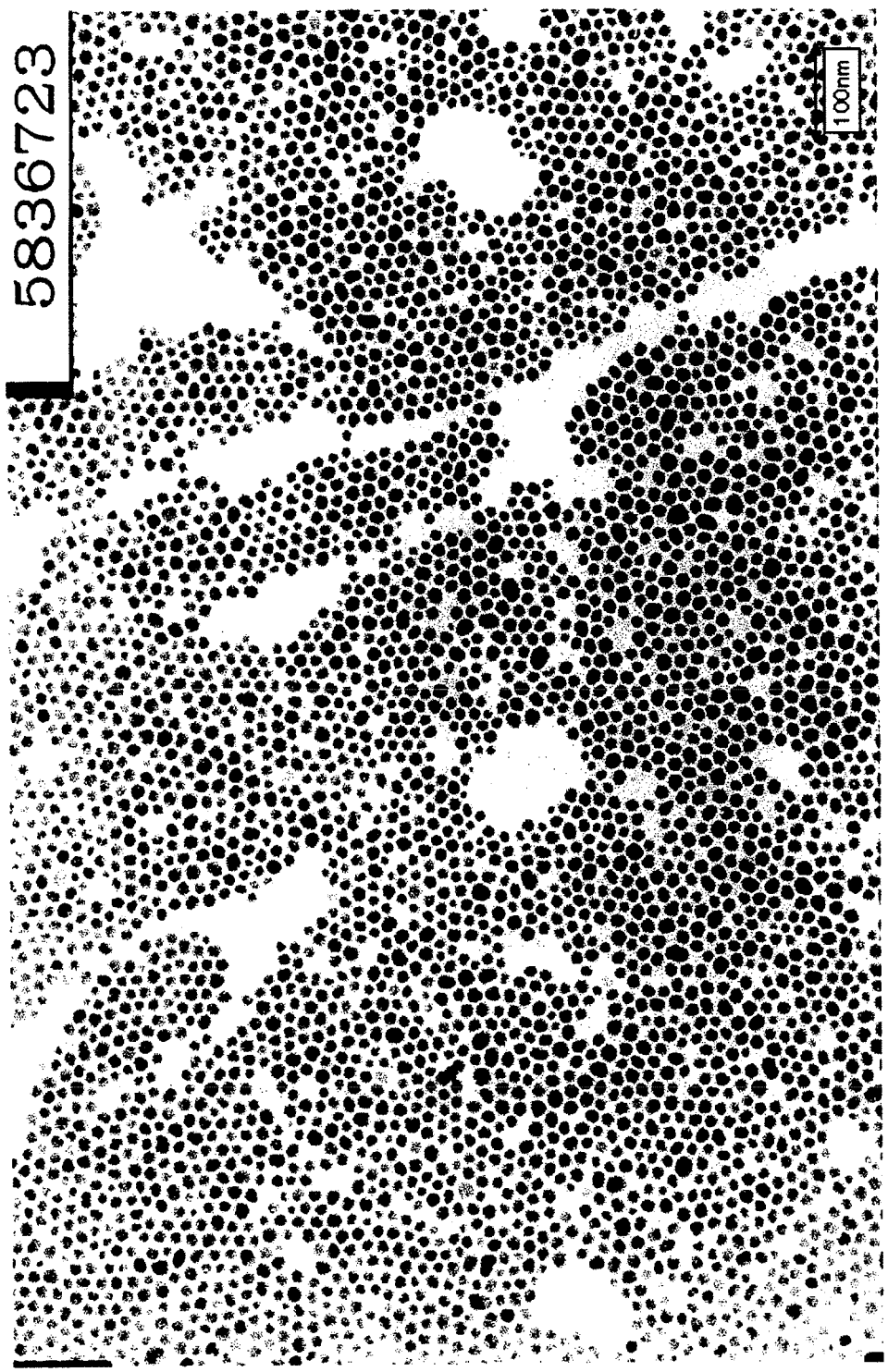
FIG. 3 is a TEM image of particles produced in Example 4, taken at a magnification of 174,000×.
Figure 4:
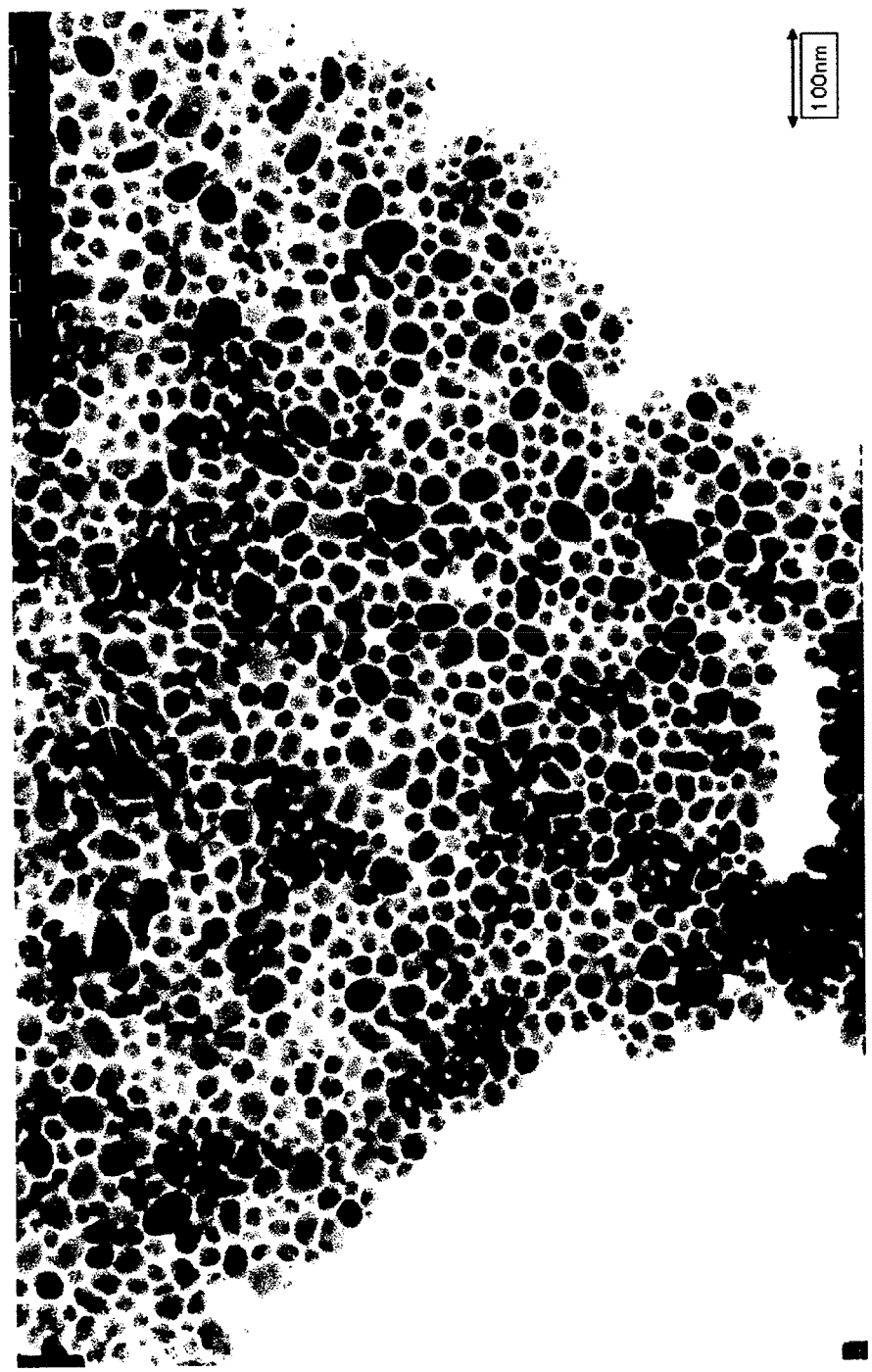
FIG. 4 is a TEM image of particles produced in Comparative Example 1, taken at a magnification of 174,000×.

For each of the Examples and Comparative Examples, the reaction scale, the additive added during manufacturing, the amount of the additive, the amount of Cu contained in the silver particle powder after the reaction, the BET specific surface area of the silver particle powder in a dried state, the TAP density thereof, the TEM diameter thereof, the coefficient of variation thereof, and the volume resistance value of the silver film are shown in Table 1. The TEM images of Examples 1, 3, and 4 are shown in FIGS. 1 to 3, and the TEM image of Comparative Example 1 is shown in FIG. 4. The magnifications of all the TEM photographs are 174,000×.

increased. Similar effects were obtained by adding a copper powder (Example 7) or cuprous oxide (Example 6). This shows that the effects of the present invention were obtained irrespective of the form of the copper component added. These effects were significant when Cu was added in an amount of 1 ppm and were saturated at about 10 ppm.

This shows that the addition of a trace amount of copper had significant effects on an increase in BET. As can be seen from the TEM image of Comparative Example 1 in FIG. 4,

TABLE 1

| Number | Additive | Reaction Scale (L) | Added Amount (ppm) (in terms of metal added relative to Ag) | Cu Content (ppm) (relative to all silver particles) | BET (m2/g) | TAP Density (g/cm3) | Primary Particle Diameter TEM Average Diameter (nm) | Primary Particle Diameter Coefficient of Variation of TEM Diameters (%) | Volume Resistance Value (μΩ · cm) 150° C. 30 min | Volume Resistance Value (μΩ · cm) 200° C. 30 min |
|---|---|---|---|---|---|---|---|---|---|---|
| Example 1 | Copper Nitrate | 5 | 1 | — | 21.8 | 2.2 | 13.1 | 21 | — | — |
| Example 2 | Trihydrate | 5 | 5 | — | 28.3 | 2.0 | 13.8 | 16 | — | — |
| Example 3 | | 5 | 10 | 1.2 | 30.4 | 2.0 | 13.2 | 19 | 3.33 | 2.1 |
| Example 4 | Cuprous Oxide | 5 | 10 | — | 29.8 | 2.0 | 13.3 | 20 | — | — |
| Example 5 | Copper Nitrate Trihydrate | 5 | 100 | — | 29.6 | 2.0 | 13.3 | 17 | — | — |
| Example 6 | Copper Powder | 5 | 100 | — | 28.8 | 1.8 | 13.2 | 19 | — | — |
| Example 7 | Copper Nitrate | 5 | 1000 | — | 29.2 | 1.9 | 14 | 17 | — | — |
| Example 8 | Trihydrate | 200 | 10 | 1.2 | 21.7 | 2.8 | 13 | 20 | — | — |
| Example 9 | | 200 | 20 | 1.4 | 23.1 | 2.0 | 12.3 | 26 | — | — |
| Example 10 | | 200 | 50 | 5.2 | 26.5 | 2.1 | 13.3 | 20 | — | — |
| Example 11 | | 200 | 100 | 8.7 | 27.7 | 2.1 | 12.9 | 17 | — | — |
| Example 12 | | 200 | 300 | 24.5 | 30.0 | 2.1 | 13.2 | 20.6 | — | — |
| Example 13 | | 200 | 500 | 114.3 | 30.7 | 2.0 | 12.2 | 22.2 | — | — |
| Comparative Example 1 | — | 5 | 0 | 0.2 | 14.2 | 2.5 | — | — | — | — |
| Comparative Example 2 | — | 200 | 0 | 0.2 | 13.6 | 2.7 | — | — | — | — |
| Comparative Example 3 | Copper Nitrate Trihydrate | 5 | 6000 | 1800 | 29.7 | 2.0 | 13.5 | 18 | 6.06 | 6.05 |
| Comparative Example 4 | | 5 | 60000 | 48000 | 25.6 | 2.0 | 13.3 | 17 | 329 | 33.9 |
| Comparative Example 5 | Nickel Nitrate Hexahydrate | 5 | 100 | — | 11.1 | 2.0 | — | — | — | — |
| Comparative Example 6 | Iron(III) Nitrate Nonahydrate | 5 | 100 | — | 11.4 | 2.0 | Unmeasurable | Unmeasurable | — | — |
| Comparative Example 7 | Copper Nitrate Trihydrate | 5 | 3000 | — | 12.6 | 2.0 | Unmeasurable | Unmeasurable | — | — |
| Comparative Example 8 | — | 5 | 0 | — | 10.6 | 2.2 | Unmeasurable | Unmeasurable | — | — |

Figure 5:
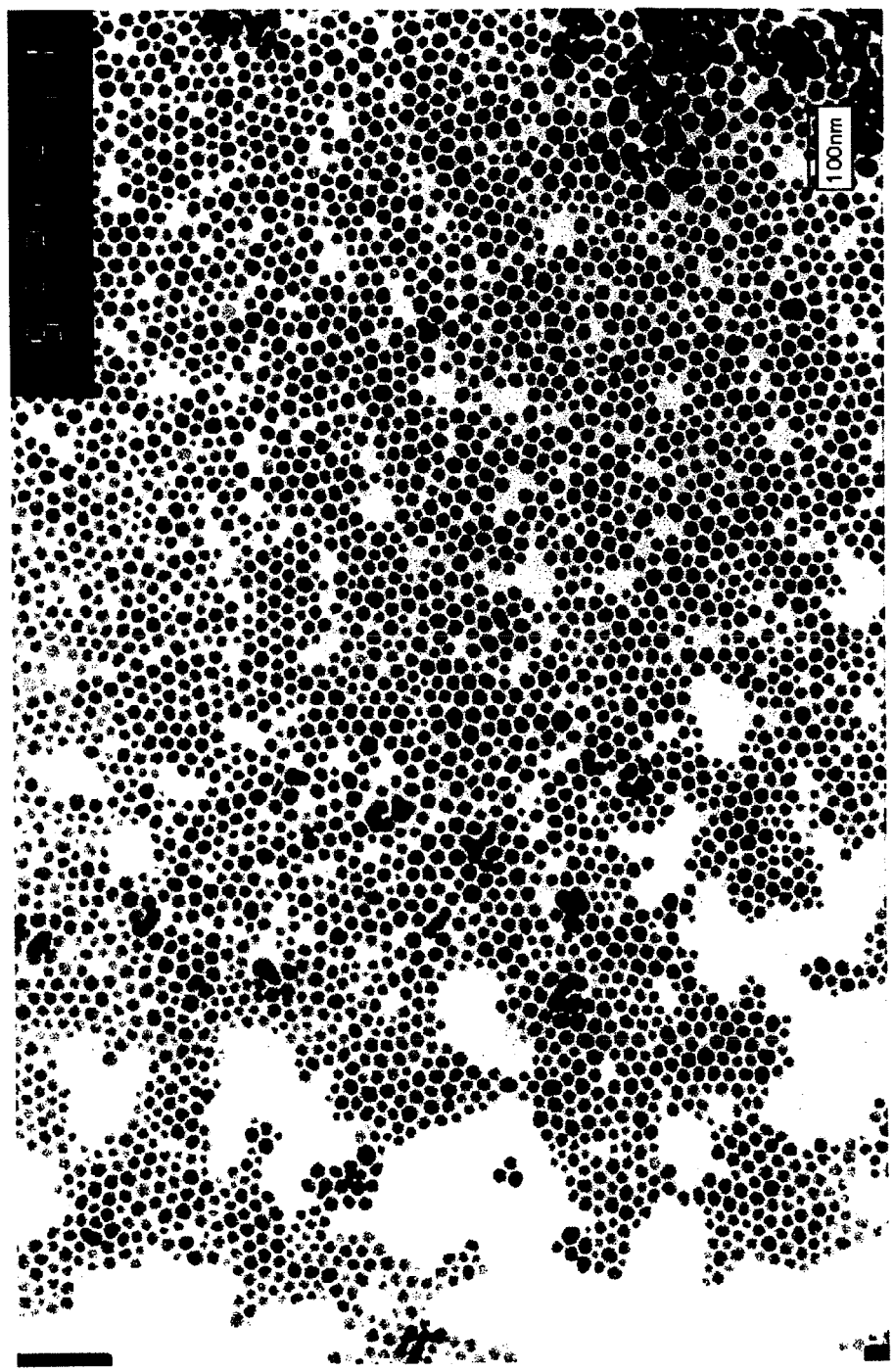
FIG. 5 is a TEM image of particles produced in Example 8, taken at a magnification of 174,000×.
Figure 6:
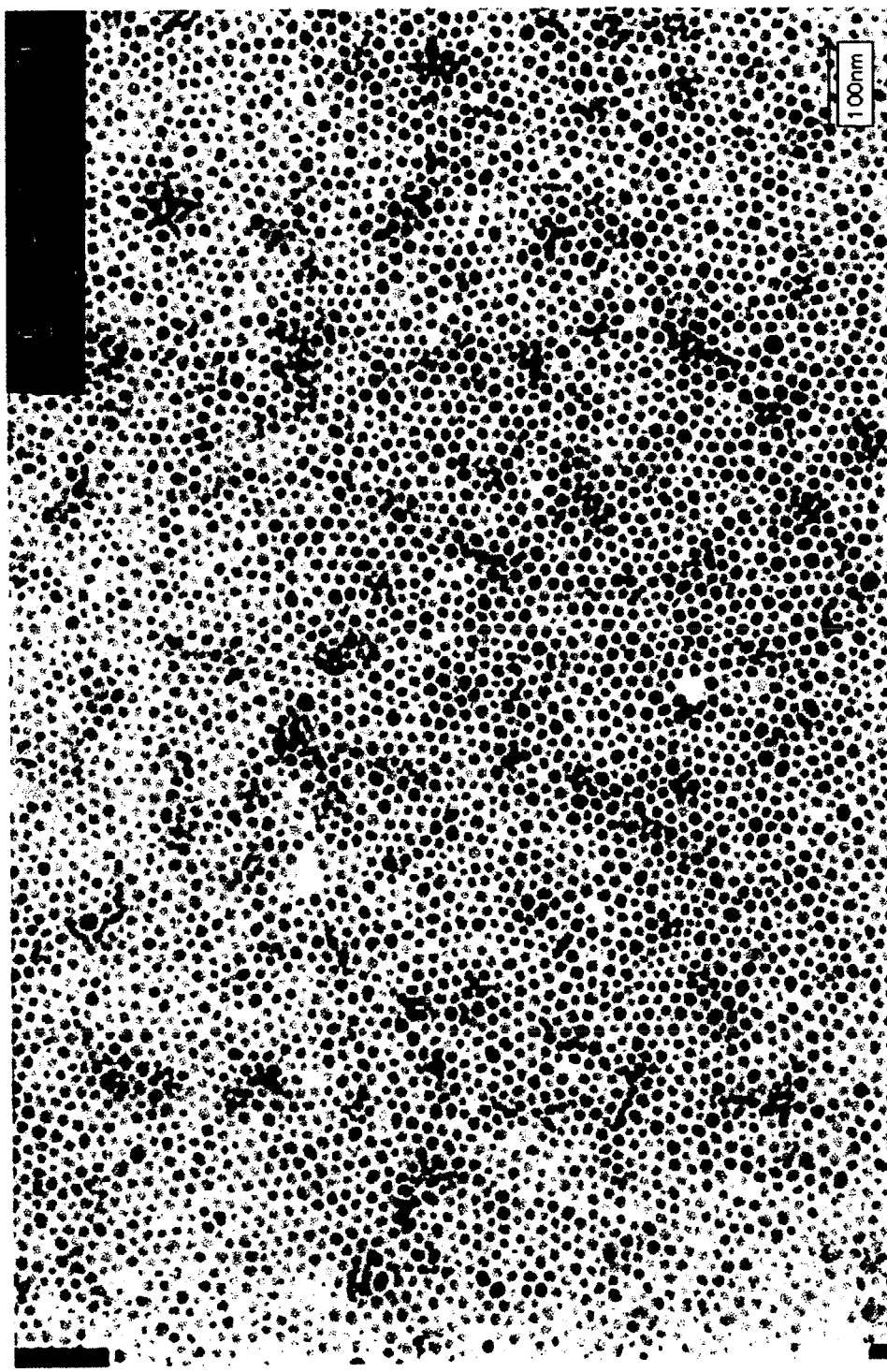
FIG. 6 is a TEM image of particles produced in Example 11, taken at a magnification of 174,000×.
Figure 7:
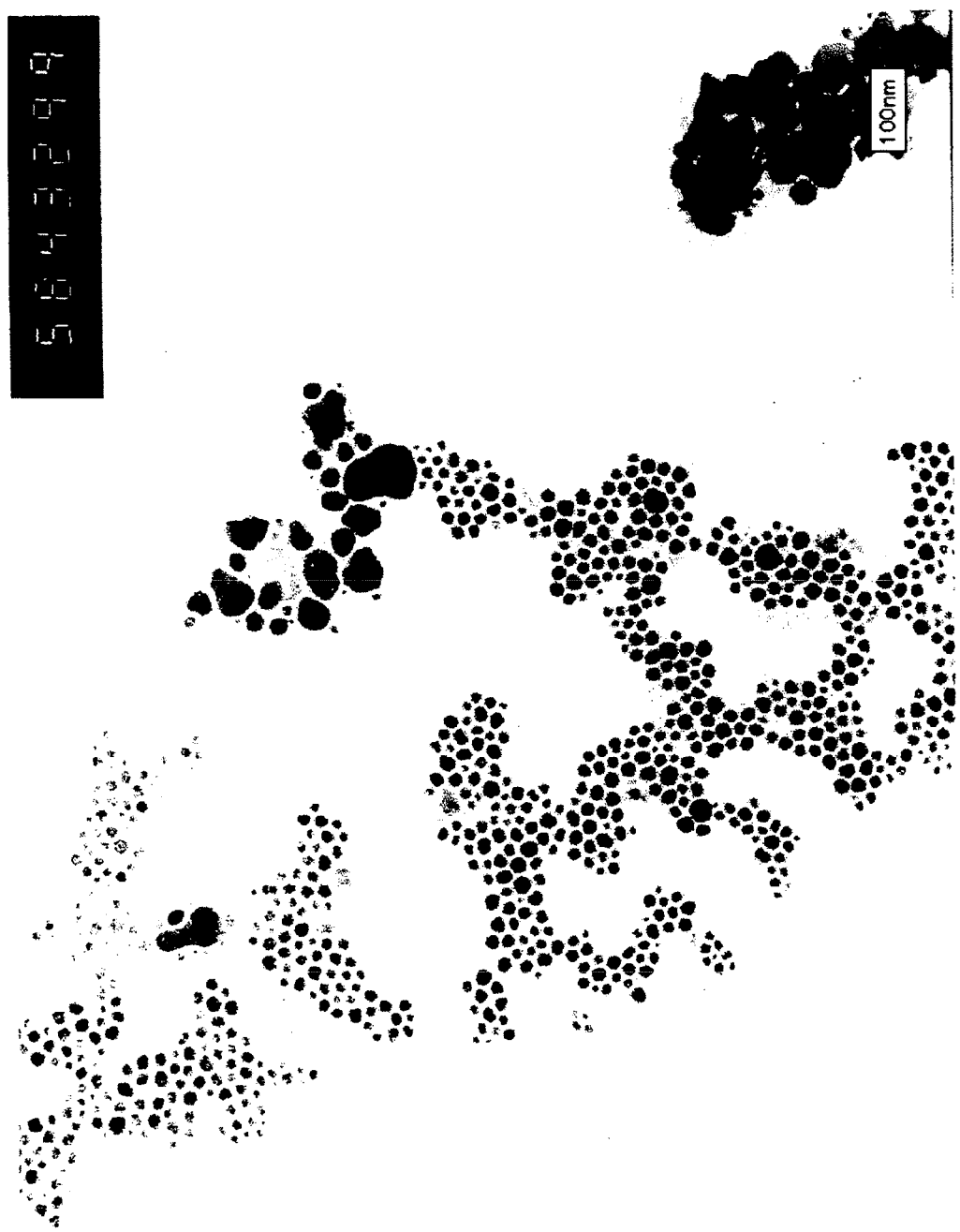
FIG. 7 is a TEM image of particles produced in Comparative Example 6, taken at a magnification of 174,000×.
Figure 8:
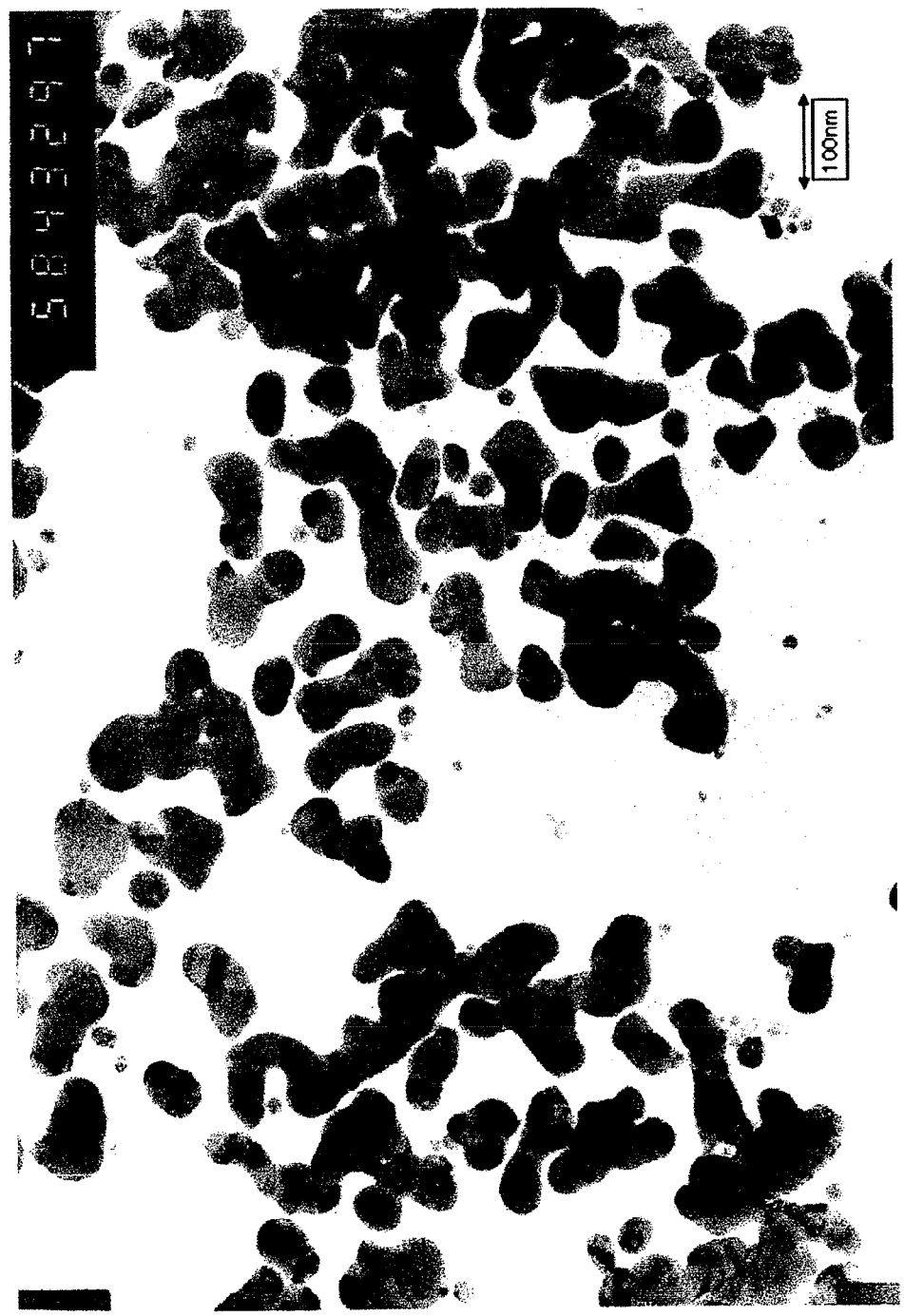
FIG. 8 is a TEM image of particles produced in Comparative Example 7, taken at a magnification of 174,000×.
Figure 9:
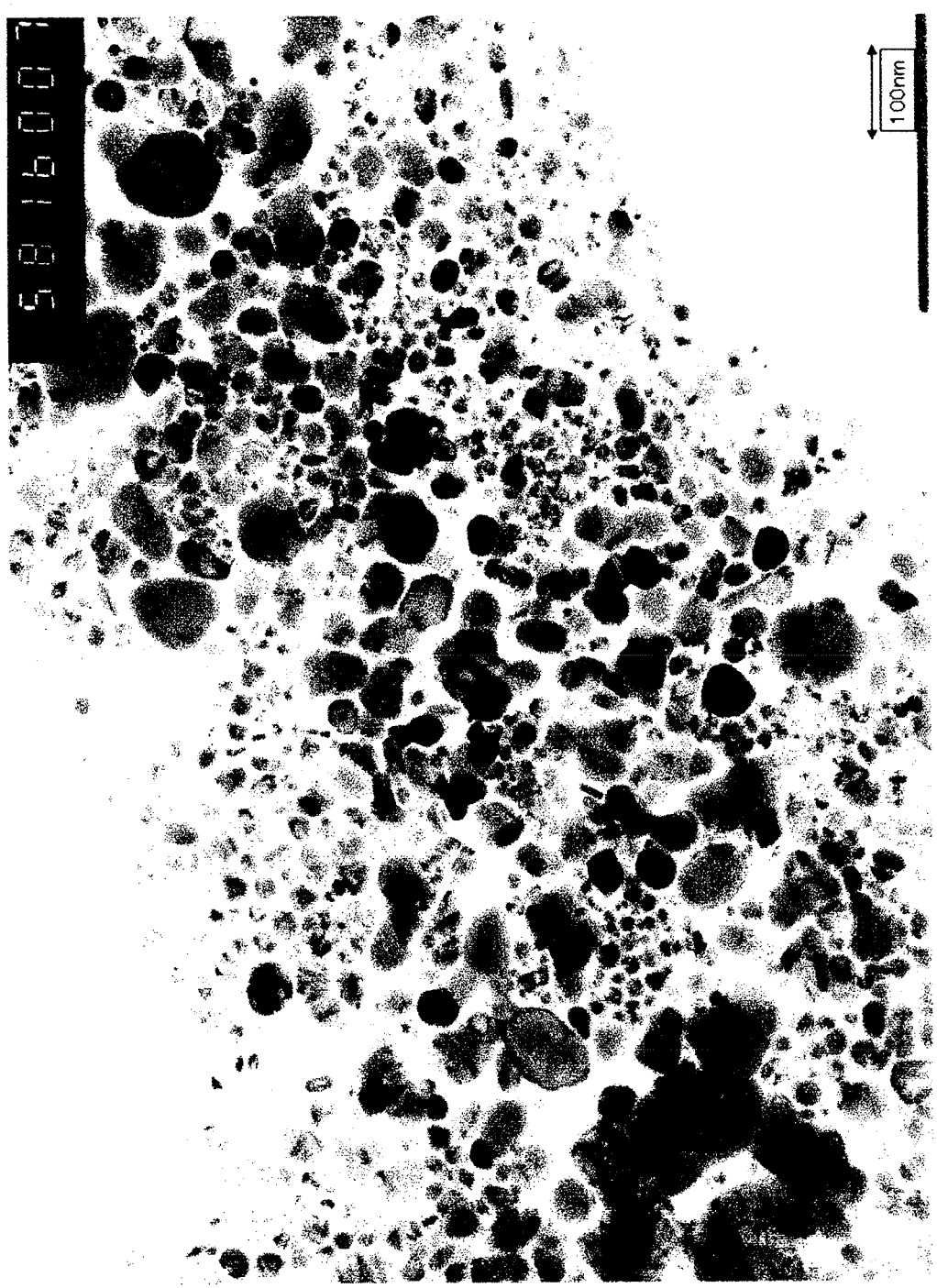
FIG. 9 is a TEM image of particles produced in Comparative Example 2, taken at a magnification of 174,000×.
Figure 10:
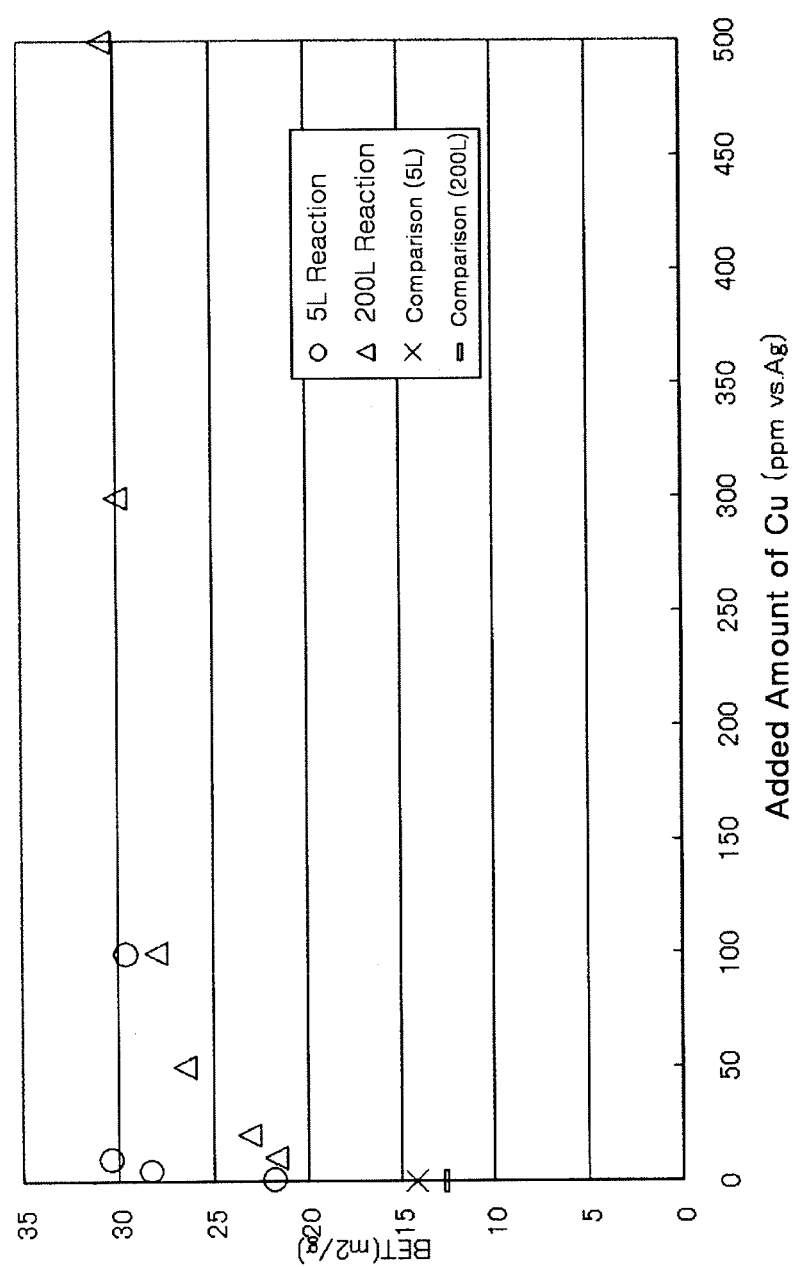
FIG. 10 is a graph showing the relationship between the added amount of a copper component and a BET specific surface area in a 5 L reaction performed in the Examples and Comparative Examples.

FIGS. 5 and 6 show the TEM images of Examples 8 and 11, FIGS. 7 and 8 show the TEM images of Comparative Examples 6 and 7, and FIG. 9 shows the TEM image of Comparative Example 2. FIG. 10 is a graph showing the relationship between the added amount of Cu and the BET in the Examples and Comparative Example separately for the 5 L reaction and 200 L reaction.

First, refer to Examples 1 to 7 and Comparative Example 1 in Table 1 and FIG. 10. In FIG. 10, the horizontal axis represents the BET, and the horizontal axis represents the amount of Cu added relative to Ag. Open circles and open triangles represent the results in the Examples using the reaction vessels of 5 L and 200 L, respectively. A solid circle and a solid triangle represent the results in Comparative Examples using the reaction vessels of 5 L and 200 L, respectively. More specifically, the solid circle represents Comparative Example 1, and the solid triangle represents Comparative Example 2.

Even in Example 1 in which 1 ppm of Cu was added, the BET was higher by 7 m²/g or more as compared to that in Comparative Examples in which Cu was not added. More specifically, this shows that, when the reaction was performed with Cu added, the BET of the silver particle powder small particles and large particles coexisted, and a large number of coagulated to particles were present. In the photograph of Example 1 shown in FIG. 1, the primary particles were clearly identified, and no large particles were found. This shows that the addition of copper reduced the number of coagulated particles and provided the effect of uniformizing the grain size.

This was also shown by the coefficient of variation obtained from each TEM image. More specifically, the coefficients of variation in Examples 1 to 7 were small values of 17 to 21%, showing very narrow grain size distributions. However, as is clear from the TEM photograph in FIG. 4, the non-uniformity of the particles was high, and the grain size distribution was broad. As can be seen from FIGS. 1 to 3, when copper was added, all the silver particles were independent. Therefore, the dispersibility was very good, and the variations in particle diameter were small.

Next, refer to Examples 8 to 13, Comparative Example 8, and FIGS. 5 and 6. As in the 5 L reaction, the addition of the copper component increased the BET of the silver particle powders. Silver particles with a uniform diameter were produced even in the 200 L reaction. This shows that the manufacturing method of the present invention can improve the variations in particle diameter irrespective of the reaction scale.

As can be seen from FIG. 10, in the 200 L reaction, the relationship between the amount of the copper component added and the BET had a smaller gradient than that in the 5 L reaction. This is very preferred from the manufacturing point of view. More specifically, to produce a silver particle powder having a desired BET by controlling the amount of the copper component added in the manner described above, the desirable silver particles can be easily obtained because the controllable range of the added amount of a copper component is wide in the 200 L reaction.

Next, refer to Comparative Examples 4 and 5. In Comparative Examples 4 and 5, the copper component was added in an amount of 6,000 ppm (0.6 mass %) and 60,000 ppm (6 mass %), respectively. In such silver particles obtained, the amounts of copper contained in the silver particles (see the column of "Cu content (ppm)" in Table 1) were also very high. This may be the reason why, when the silver particles in Comparative Example 4 or 5 were used to form a silver film, the resistance value was impaired as compared to that in Example 3.

Next, refer to Comparative Examples 6 and 7 and FIGS. 7 and 8. In Comparative Examples 6 and 7, a nickel component and an iron component, respectively, were added instead of the copper component, and the effects of the present invention were not obtained. This shows that the addition of the copper component is necessary in the manufacturing method of the present invention.

Next, refer to Comparative Example 3. In Comparative Example 3, the copper component was added after completion of the reduction reaction, and the effects of the present invention were not obtained. This shows that, in the manufacturing method of the present invention, the copper component must be added before completion of the reduction reaction.

As can be seen from Comparative Example 8 and FIG. 9, by increasing the amount of the reducing agent, the rate of the reduction reaction was increased. However, a large number of coarse particles were found in FIG. 9. This shows that it is not sufficient to simply increase the rate of the reduction reaction, and the presence of the copper component is necessary for the grain size distribution and dispersibility.

In each of the Examples, the copper and silver components were pre-mixed, and the mixture was mixed with the reducing agent solution. Therefore, the copper component was present in the solution mixture before the reduction reaction was started, and therefore the end point of the reduction reaction was determined by the change in color of the reaction slurry. However, even when the change in color of the reaction slurry is completed, the reduction reaction may not be completed in some cases. Therefore, even when the reduction reaction is performed using only the silver compound solution, the protective agent, and the reducing agent and the change in color of the reaction slurry is completed, the effects of the present invention can also be obtained by adding the copper component.

In the Examples and Comparative Examples, the volume resistivity was measured using a dispersion containing no binder, and the results were compared. Next, the results of the evaluation of a conductive film when a binder was added to the silver particle powder of the present invention will be shown.

INDUSTRIAL APPLICABILITY

With the manufacturing method of the present invention, silver particles can be easily produced in a large scale reaction as well as a small scale reaction. Therefore, the manufacturing method of the present invention is excellent in mass productivity. The silver particles of the present invention have small variations in particle diameter and can be re-dispersed in various solvents. Therefore, the silver particles are suitable for a dispersion used for metal trace applications.

The invention claimed is:

1. A method for manufacturing silver particles, the method comprising:
mixing a copper component in an amount of 1 to 1,000 ppm relative to an amount of silver, a protective agent, and a reducing agent into a solution; and
adding a silver solution to the solution to precipitate silver particles of which surfaces are coated with an organic material as the protective agent, thereby obtaining particles with an average particle diameter ($D_{TEM}$) of 5 to 100 nm as measured using a transmission electron microscope,
wherein the molar ratio of the added amount of the protective agent to the amount of silver is 0.1 to 3.0 and the protective agent is a compound having 5 to 8 carbon atoms.

2. The method for manufacturing silver particles according to claim 1, wherein the silver ion is reduced under a condition of 40 to 80° C.

3. The method for manufacturing silver particles according to claim 1, wherein the used organic material with which the surfaces of the silver particles are coated has a boiling point of 250° C. or less if the organic material is a liquid at room temperature, and has a decomposition point or a sublimation point of 250° C. or less if the organic material is a solid at room temperature.

4. The method for manufacturing silver particles according to claim 1, wherein the organic material that constitutes the surfaces of the silver particles has a carboxyl group or a hydroxyl group.

5. A method for manufacturing a silver particle dispersion, the method comprising obtaining a powder of silver particle aggregates by subjecting the silver particles obtained by the method for manufacturing silver particles according to claim 1 to filtration, washing with water, and drying and dispersing the obtained powder of the aggregates in a dispersion medium.

6. A method for manufacturing a silver particle paste, the method comprising adding a resin to the dispersion obtained by the manufacturing method according to claim 5.

7. The method for manufacturing silver particles according to claim 1, wherein the copper component is mixed in an amount of 1 to 500 ppm relative to the amount of silver.

8. The method for manufacturing silver particles according to claim 1, wherein the mixing and the adding are processed with bubbling inert gas.

9. The method for manufacturing silver particles according to claim 1, wherein the solution including the reducing agent before the silver is reduced is under a nitrogen atmosphere.

10. A method for manufacturing silver particles, the method comprising:
mixing a protective agent, and a reducing agent into a solution;
mixing a silver solution with a copper component in an amount of 1 to 1,000 ppm relative to an amount of silver in the silver solution;
further mixing the mixture solutions obtained in the preceding two steps to precipitate silver particles of which surfaces are coated with an organic material as the protective agent, thereby obtaining particles with an average particle diameter ($D_{TEM}$) of 5 to 100 nm as measured using a transmission electron microscope,
wherein the molar ratio of the added amount of the protective agent to the amount of silver is 0.1 to 3.0 and the protective agent is a compound having 5 to 8 carbon atoms.

* * * * *